US007688441B2

(12) United States Patent
Hertter et al.

(10) Patent No.: US 7,688,441 B2
(45) Date of Patent: Mar. 30, 2010

(54) ARRANGEMENT FOR MONITORING THERMAL SPRAY PROCESSES

(75) Inventors: Manuel Hertter, Munich (DE); Joerg Hoeschele, Meckenbeuren-Brochenzell (DE); Stefan Schneiderbanger, Lauterbach (DE); Juergen Steinwandel, Uhldingen-Muehlhofen (DE)

(73) Assignee: MTU Aero Engines GmbH, Munich (DE)

( * ) Notice: Subject to any disclaimer, the term of this patent is extended or adjusted under 35 U.S.C. 154(b) by 350 days.

(21) Appl. No.: 11/887,797

(22) PCT Filed: Mar. 30, 2006

(86) PCT No.: PCT/DE2006/000555

§ 371 (c)(1),
(2), (4) Date: Oct. 3, 2007

(87) PCT Pub. No.: WO2006/105762

PCT Pub. Date: Oct. 12, 2006

(65) Prior Publication Data

US 2009/0051915 A1 Feb. 26, 2009

(30) Foreign Application Priority Data

Apr. 8, 2005 (DE) ...................... 10 2005 016 189

(51) Int. Cl.
*G01J 3/04* (2006.01)

(52) U.S. Cl. ...................................................... 356/310

(58) Field of Classification Search ....................... None
See application file for complete search history.

(56) References Cited

U.S. PATENT DOCUMENTS

| | | | | |
|---|---|---|---|---|
| 5,986,277 | A | 11/1999 | Bourque et al. | 250/554 |
| 6,034,781 | A | 3/2000 | Sarfaty et al. | 356/436 |
| 6,744,041 | B2 * | 6/2004 | Sheehan et al. | 250/283 |
| 6,797,939 | B2 | 9/2004 | Bayer et al. | 250/226 |
| 7,294,830 | B2 * | 11/2007 | Hieftje et al. | 250/287 |

FOREIGN PATENT DOCUMENTS

| | | |
|---|---|---|
| DE | 101 40 299 | 3/2003 |
| EP | 0 542 542 B1 | 5/1997 |
| EP | 1 284 588 | 2/2003 |
| JP | 2005-317341 | 11/2005 |

* cited by examiner

*Primary Examiner*—Tu T Nguyen
(74) *Attorney, Agent, or Firm*—Davidson, Davidson & Kappel, LLC

(57) ABSTRACT

An arrangement for measuring characteristic properties of a plasma beam in a thermal spray process, including a device for introducing spray materials into the plasma, a one-dimensional or two-dimensional array including first optical waveguides for receiving the light radiation emitted by the plasma, and other optical waveguides for distributing the light radiation emitted by the plasma. A device is provided for splitting the light guided in the first optical waveguides into the other optical wave guides, one optical waveguide being connected to the opening diaphragm of a particle flow arrangement, and the other optical waveguide being connected to the opening diaphragm of a spectrometer. A device is also provided for determining the current state of the spray process.

4 Claims, 1 Drawing Sheet

ARRANGEMENT FOR MONITORING THERMAL SPRAY PROCESSES

The present invention relates to a system for monitoring thermal spray processes.

BACKGROUND

A system for real-time (on-line) detection of powder spray particles in a plasma beam is known from EP 0 542 542 B1. The light radiation emitted by the plasma beam is focused on one end of an optical fiber. At the other end of the optical fiber, the light radiation is split into two light beams using a dichroic lens, which are each conveyed to a photodetector. The intensity distribution over time is determined for each light beam in the photodetectors. Using a filter upstream from the photodetectors, suitable wavelength ranges may be filtered out of the light radiation and their intensity curve over time may be determined.

The option of using an optical fiber bundle and to convey the received radiation to a CCD camera is also described in EP 0 542 542 B1.

Another system, in which photodetectors are used for determining the intensity distribution over time of a light radiation emitted from a plasma, is known from U.S. Pat. No. 5,986,277.

Only the intensity distribution of the light radiation in the plasma and the speed and the temperature of the particles may thus be determined in this system.

Monitoring the process variables relevant for the spray process is described in DE 101 40 299 A1. The light radiation is spectrometrically examined and analyzed in this system. The plasma composition, the composition of the spray materials, and the gas and material flow are determined in addition to the speed and temperature of the particles.

However, monitoring the particle beam and the coating formation is not possible in the described system.

A known method for monitoring the coating process is the particle flux imaging method (PFI method). PFI diagnostics is an imaging method that has been developed for industrial use. An optical CCD camera records the luminous area of the spray jet between the source of the spray jet and the coating area, the separation of hot areas and colder zones being implemented via transmission-adjusted gray filters. The method is used for monitoring the particle beam as well as the plasma or high-speed flame spray jet. The intensity characteristics of the beams are detected and reproduced with minimum technical complexity via simple ellipse geometries whose parameters react sensitively to changes in the process parameters. In this way, the PFI method allows monitoring and quality control of the entire spray process all the way to coat formation.

However, a disadvantage of a system which operates according to the PFI method is that the PFI method may be used in a controlling manner only before and after termination of a spray process. In addition, high-resolution process control is not possible with the PFI method since the entire PFI system is not movable by design and is configured in such a way that the entire area between source and coating area is monitored. Monitoring of individual sub-areas of the spray jet is not possible.

SUMMARY OF THE INVENTION

An object of the present invention is to create a system which makes comprehensive high-resolution on-line process control of sub-areas of the spray jet from the plasma source all the way to the entire coating area possible, with simultaneous monitoring of the coat formation.

This object may be achieved through the system for measuring characteristic properties of a plasma beam in a thermal spray process.

According to the present invention, means are provided for splitting the light, guided in the first optical fibers, into the further optical fibers, the first optical fibers being connected to the input aperture of a particle flux system and the other optical fibers being connected to the input aperture of a spectrometer, and means being provided for ascertaining the instantaneous state of the spray process. The analysis takes place in each case according to a method known to those skilled in the art.

It is advantageous if the light beams are conveyed to the particle flux imaging system and to the spectrometers in a timely synchronized manner, thereby making additional spectral information for selected PFI ellipse points and thus comprehensive process control possible.

The system according to the present invention allows comprehensive on-line process control of the thermal spray process by combining the advantages of PFI technology with optical spectroscopy. The system is thoroughly on-line compatible in particular and, due to its conceptual design, also suitable to carry out a process regulation.

In contrast to the related art, the time characteristic of an entire spectrum and the light density at a defined position may be determined for each optical fiber using the system according to the present invention. A spectral resolution of individual pixels (formed by the individual optical fibers) along the plasma beam is achieved using the spectrometer. At the same time, a spatially high-resolution analysis of the light density of the plasma beam is achieved using the PFI method via individual pixels (formed by the individual optical fibers).

In addition, it is possible to identify powder spray materials as well as gas and fluid precursors from the measured spectra based on characteristic spectral lines and to determine their time characteristics. Identification of the respective spectral lines is possible for each optical fiber independently. It is thus possible in particular in the system according to the present invention to examine the plasma beam in space and time with regard to its instantaneous process state.

It is a further advantage that it is possible, for example, to determine simultaneously the speeds of multiple different particles contained in the plasma beam. In addition, a plurality of different gas and material flows may be simultaneously determined in the plasma beam. This is of particular advantage when not only one powder material but rather a powder mixture, for example, is used as the spray material.

In an advantageous embodiment of the present invention it is possible to supply the light radiation of the individual optical fibers of the array according to the present invention sequentially to a single spectrometer. The array may be a linear array in particular or a square or a rectangular array having a 4×4 or a 5×5 matrix.

To this end, each optical fiber in the array is sequentially scanned and the light radiation is thus sequentially conveyed to the spectrometer. This yields the advantage of considerable space and cost savings for the components required for the method. Using the circuits known to those skilled in the art, switching the individual optical fibers over to the spectrometer is possible without major loss of time.

In another advantageous embodiment of the present invention it is possible to regulate the process parameters of the spray process based on the process state ascertained from the spectra. It is possible, for example, to regulate the gas and material flows of the plasma beam and the spray material injected into the plasma.

BRIEF DESCRIPTION OF THE DRAWINGS

The present invention is explained in greater detail by way of example in the following based on the drawings.

DETAILED DESCRIPTION

Figure 1:
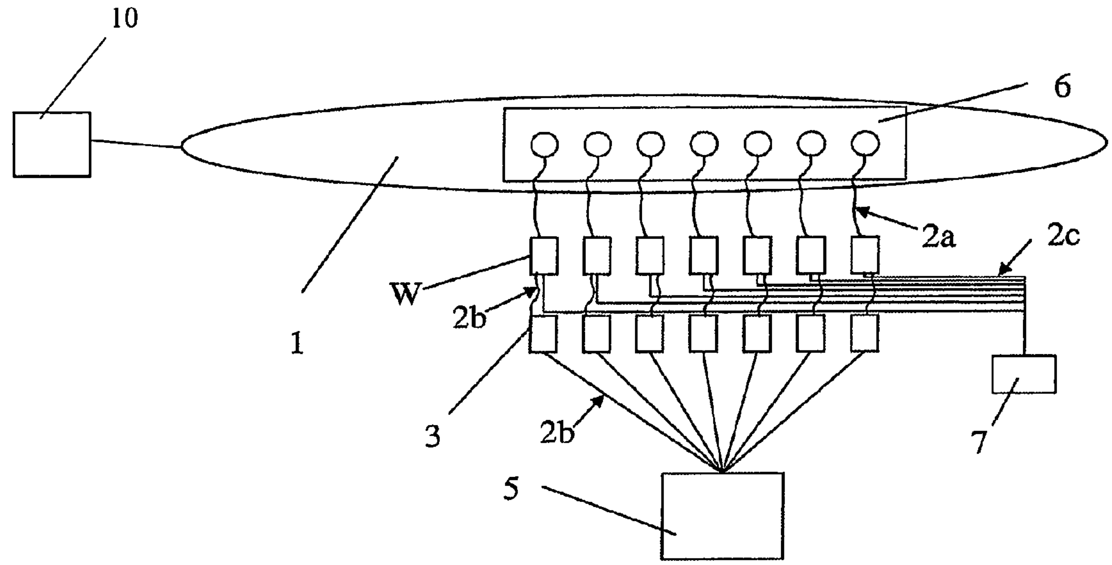
FIG. 1 shows a first specific embodiment of the system according to the present invention.

FIG. 1 shows a first specific embodiment of the system according to the present invention. Optical fibers 2*a* are situated in an exemplary one-dimensional array 6. Of course, a two-dimensional array is also possible. The light emitted by plasma 1 enters optical fibers 2*a*. Optical fibers 2*a* are each connected to a light splitter W. The light coming from optical fibers 2*a* is split in equal portions into optical fibers 2*b* and 2*c*. Optical fibers 2*b* are each connected to a spectrometer 3. Optical fibers 2*c* are connected to the CCD camera of a PFI system 7. Optical fibers 2*c* thus form an image of the section of the spray jet on the input aperture of the CCD camera. A spray injector 10 can inject spray materials into plasma 1.

The light of plasma 1 is broken down into its spectral components in spectrometer 3. The frequency spectra generated in the individual spectrometers 3 are further processed in a processor 5, a computer, for example.

Figure 2:
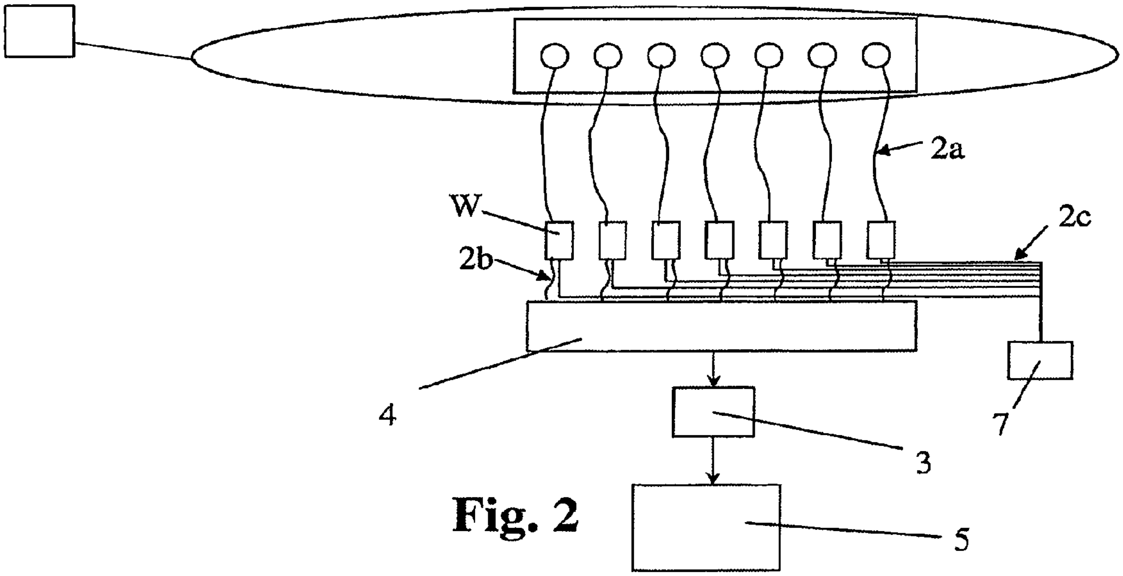
FIG. 2 shows a second specific embodiment of the system according to the present invention.

FIG. 2 shows a second specific embodiment of the system according to the present invention. The configuration in FIG. 2 essentially corresponds to the configuration in FIG. 1. However, the individual optical fibers 2 are connected to a distribution circuit 4 in the embodiment represented in FIG. 2. This distribution circuit 4 now sequentially conveys the information of the individual optical fibers 2 to spectrometer 3. Of course, distribution circuit 4 may be controlled by a control circuit.

What is claimed is:

1. A system for measuring characteristic properties of a plasma beam in a thermal spray process comprising:

means for introducing spray materials into a plasma;

a one-dimensional or two-dimensional array of first optical fibers for receiving light radiation emitted by the plasma;

further optical fibers for distributing the light radiation emitted by the plasma;

means for splitting the light guided in the first optical fibers into the further optical fibers, one of the further optical fibers being connected to an input aperture of a particle flux system and another of the further optical fibers being connected to a spectrometer; and means for ascertaining an instantaneous state of the spray process.

2. The system as recited in claim 1, wherein supply of the light beams to the particle flux system and to the spectrometer is synchronized in time.

3. The system as recited in claim 1, further comprising means for sequentially supplying the light beams of the individual optical fibers to the spectrometer.

4. A system for measuring characteristic properties of a plasma beam in a thermal spray process comprising:

a spray injector introducing spray materials into a plasma;

a one-dimensional or two-dimensional array of first optical fibers receiving light radiation emitted by the plasma;

further optical fibers distributing the light radiation emitted by the plasma;

at least one light splitter splitting the light guided in the first optical fibers into the further optical fibers, one of the further optical fibers being connected to an input aperture of a particle flux system and another of the further optical fibers being connected to a spectrometer, the particle flux system capable of ascertaining an instantaneous state of the spray process.

* * * * *